United States Patent [19]

Grimm et al.

[11] Patent Number: 4,765,676
[45] Date of Patent: Aug. 23, 1988

[54] RIGID LID FOR AN AUTOMOBILE ROOF

[75] Inventors: Rainer Grimm, Wetzlar; Horst Böhm, Frankfurt am Main; Albert Schlapp, Dreieich; Rainer Hattass, Gründau; Dieter Federmann, Hanau, all of Fed. Rep. of Germany

[73] Assignee: Rockwell-Golde GmbH, Fed. Rep. of Germany

[21] Appl. No.: 55,386

[22] Filed: May 29, 1987

[51] Int. Cl.⁴ .................. B60J 7/04; B60J 7/195
[52] U.S. Cl. ..................... 296/216; 296/218; 296/221; 296/222; 49/488
[58] Field of Search ............... 296/216, 218, 221, 222; 49/488

[56] References Cited

U.S. PATENT DOCUMENTS

| | | | |
|---|---|---|---|
| 4,371,204 | 2/1983 | George | 296/218 |
| 4,509,791 | 4/1985 | Bienert et al. | 296/216 |
| 4,666,206 | 5/1987 | Hough | 296/218 X |

FOREIGN PATENT DOCUMENTS

| | | |
|---|---|---|
| 0109428 | 6/1984 | Japan . |
| 0109427 | 6/1984 | Japan . |
| 8503254 | 6/1986 | Netherlands . |
| 2106050 | 4/1983 | United Kingdom . |

Primary Examiner—Dennis H. Pedder

[57] ABSTRACT

In a rigid lid for an automobile roof which, in its closed position, sealingly closes a roof opening out of which it can be displaced to at least partly expose it, a translucent or transparent lid plate is carried by an inner frame placed beneath it in its edge region, which inner frame projects beyond the edge of the lid plate and terminates there in a raised rim, onto which an edge gap sealing strip is pushed. For achieving a low overall depth of the lid accompanied by simple assembly and dismantling, a clamping bar is fixed to the inner frame, with which clamping bar an upper border frame is releasably engaged, which border frame securely holds, on the one hand the sealing strip in a manner preventing stripping-off and on the other hand the lid plate with respect to the inner frame. A further simplification of dismantling is achieved, according to a second form of embodiment, in that the inner frame is connected to the upper edge frame releasably by fixing screws.

12 Claims, 2 Drawing Sheets

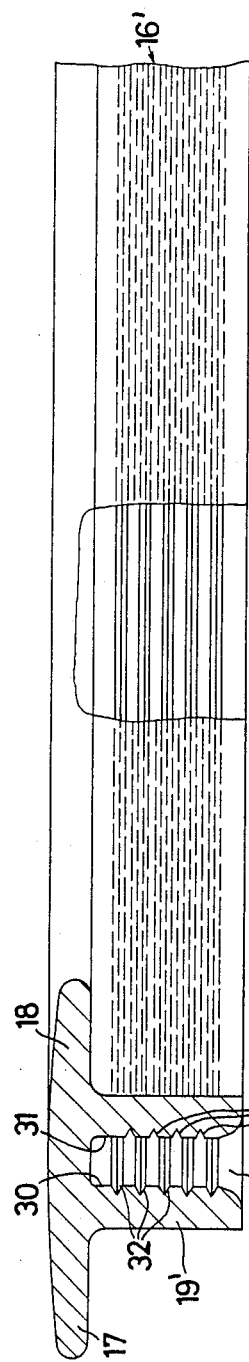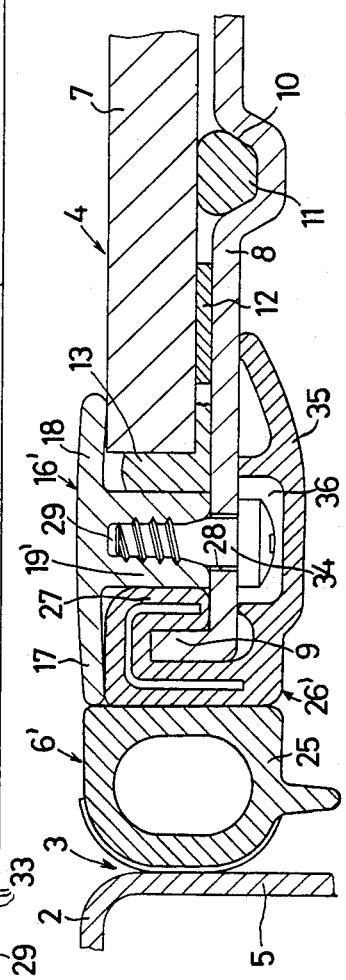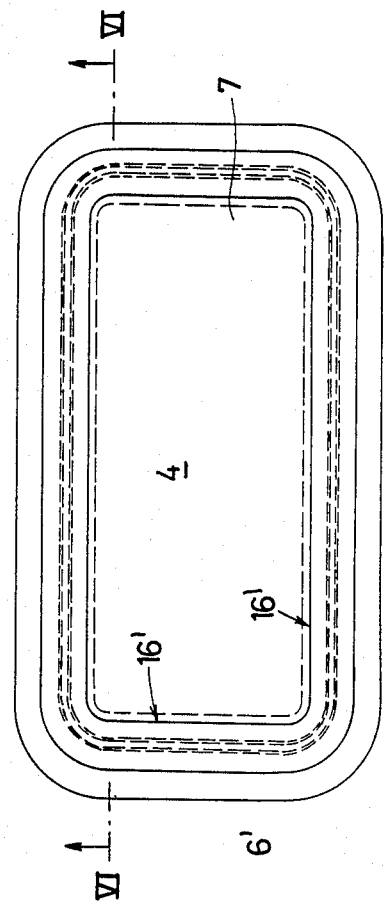

RIGID LID FOR AN AUTOMOBILE ROOF

FIELD OF THE INVENTION

This invention relates to a rigid lid for a sliding, lifting or sliding-lifting roof of an automobile.

DESCRIPTION OF THE PRIOR ART

Such a lid is known for a roof which, in its closed position, sealingly closes a roof opening by means of an edge gap sealing strip fixed to it and can be displaced out of the roof opening to expose it at least partly, comprising a lid plate of translucent or transparent material, an inner frame supporting the lid plate in its edge region from below through the intermediary of sealing compound or adhesive and having a peripheral, raised rim, and a border frame bearing against the upper face of the lid plate, which border frame carries, on a downwardly orientated web, lateral detents which co-operate with detents on a partly resilient clamping bar, which engages on the inner frame for connecting the inner frame with the border frame, wherein the edge gap sealing profile externally adjoins the border frame, which covers over the fixing flange of the sealing strip, fixed by being pushed onto the lid. A known lid of this construction is disclosed in DE-PS 31 33 141, in which the border frame is equipped with two downwardly orientated webs, between which the raised rim of the inner frame is firmly clamped by means of a clamping bar pushed between the outer web and the raised rim. The outer web is here equipped, at its inner side, with sawtooth-like detents, which co-operate with sawtooth-like counter-detents disposed on the outer side of the clamping bar. The lid plate, together with the inner frame, is thereby unreleasably clamped between the edge frame and a flange of the clamping bar formed as a spring element. The known lid therefore can no longer be dismantled without destruction after it has been assembled, but this may be desirable for repair purposes.

By the use of a clamping bar having a flange which bears from below against the inner frame and furthermore is obliquely orientated on account of its construction as a spring element, a relatively large overall height of the known lid results, to which also the special construction of the detents contributes.

Other disadvantages of the known lid can be attributed to the manner of fitting the edge gap sealing profile. Since the edge gap sealing profile, as a consequence of its friction against the downwardly bent rim of the roof opening, is unavoidably subjected to wear during closing and opening operations, it is desirable to be able to replace the edge gap sealing strip profile in a simple manner. In one embodiment of the known lid, replacement is, however, accompanied by difficulties, because the sealing strip, pushed laterally onto the border frame, must be forced into a back-cut groove during a replacement and, of course, at the first installation, so that a guarantee of uniform bearing against the border frame is not assured. The sealing strip can indeed, in another form of embodiment of the known lid, be easily replaced, because it has to be pushed from below onto the downwardly cranked rim of the border frame, but this form of embodiment has the disadvantage that, in opening operations of the lid, the sealing strip can be easily stripped off.

A further known lid is disclosed in DE-GM 79 12 486, in which the lid plate is also placed upon an inner frame, which possesses an upwardly cranked flange projecting outwardly beyond the periphery of the lid plate, onto which flange the sealing strip is pushed from above. The sealing strip is here so constructed that it bears from above with a laterally projecting lip on the edge of the lid plate. Since, for a firm seating of the sealing strip, a sufficient clamping height is necessary, the rim of the inner frame is first clamped downwards and then upwards in arc form to achieve this clamping height. This measure, however, again leads to a considerable overall depth of the lid. Furthermore, the sealing strip pushed on from above is not assured against stripping off during closure of the lid. A disadvantage in this known lid is also the problematic sealing against penetrating water, because the sealing and covering lip projecting downwards from the sealing strip towards the lid plate is not suitable for ensuring a reliable protection against penetrating water. Penerating water collects in the gutter-like, bent rim of the inner frame and inevitably leads to corrosion damage, because no discharge is available. The same is true also for another form of embodiment of this known lid, in which however the sealing strip is secured not to the lid, but to the edge of the roof opening.

OBJECT OF THE INVENTION

An object of the present invention is to provide a rigid lid which can be of comparatively low overall height accompanied by simple assembly and dismantling of its components including the sealing strip, and also provide a reliable securing of the sealing strip against stripping off both in the closing and in the opening direction of the lid.

SUMMARY OF THE INVENTION

According to one aspect of the present invention, there is provided a rigid lid for a sliding, lifting or sliding-lifting roof for an automobile, which, in the closed position of the lid, is intended sealingly to close a roof opening by means of an edge gap sealing strip fixed to it, the lid comprising a lid plate, a first, inner frame supporting the lid plate in its edge region from below and having a peripheral, raised rim on which said sealing strip is pressed, a second, border frame bearing against an upper face of the lid plate and carrying detents which co-operate with detents on a resilient clamping bar, which engages on said first frame to connect said first frame with said second frame, said sealing strip externally adjoining said second frame, said clamping bar being fixed to the upper side of said first frame at a distance from and substantially parallel to said raised rim and being constructed to be resilient in a lateral direction so as to be detachably engaged with said second frame, said second frame having a substantially T-shaped cross-section forming an inner and an outer flange and resiliently pressing with its outer flange on said sealing strip, which engages by means of a flange formed thereon into the gap between said raised rim and said clamping bar, and said second frame also resiliently pressing, with its inner flange on said lid plate thereby pressing said lid plate against said first frame.

According to a second aspect of the present invention, there is provided a rigid lid for a sliding, lifting or sliding-lifting roof for an automobile, which, in the closed position of the lid, is intended sealingly to close a roof opening by means of an edge gap sealing strip fixed to it, the lid comprising a lid plate, a first, inner frame supporting the lid plate in its edge region from below and having a peripheral, raised rim on which said sealing strip is pressed, a second, border frame bearing against an upper face of the lid plate, which second frame is equipped, on a downwardly orientated web, with acute-angled grooves disposed one above another, which co-operate with corresponding threads on fixing screws which engage onto said first frame to connect the first frame with said second frame, said sealing strip externally adjoining said second frame, said downwardly orientated web of said second frame possessing a downwardly open slit having mutually facing lateral surfaces which are each furnished with acute-angled grooves, of which the grooves of one said lateral surface are offset in height relative to the grooves of the other lateral surface by the pitch of a screw thread, while the width of said slit is approximately equal to the core diameter of said fixing screws, which screws are passed through bores disposed in said first frame in a row parallel to said raised rim and are releasably screwed into said grooves, said second frame having a substantially T-shaped cross-section forming an inner and an outer flange and pressing with its outer flange on said sealing strip which engages, by means of a flange formed thereon between said raised rim and said web, on said second frame, and said second frame also pressing with its inner flange on said lid plate thereby pressing said lid plate onto said first frame.

BRIEF DESCRIPTION OF THE DRAWINGS

For a better understanding of the invention and to show how the same may be carried into effect, reference will now be made, by way of example, to the accompanying drawings, in which:

FIG. 4 is a plan view of a finally assembled lid of a second form of embodiment, FIG. 5 is a sectional view, partly cut away, of part of an edge frame of the embodiment shown in FIG. 4, and FIG. 6 is a partial section along the line VI—VI in FIG. 4.

DESCRIPTION OF THE PREFERRED EMBODIMENTS

Figure 1:
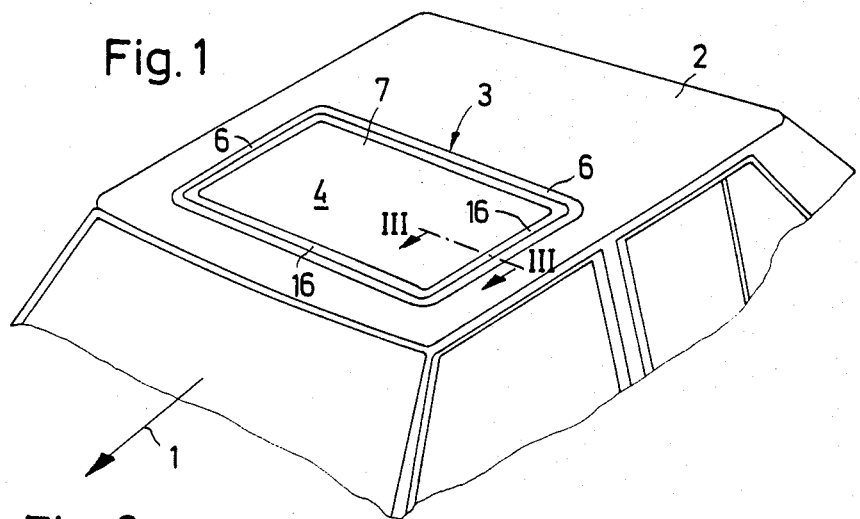
FIG. 1 is a partial perspective view of an automobile roof with its rigid lid shown in a closed position.
Figure 3:
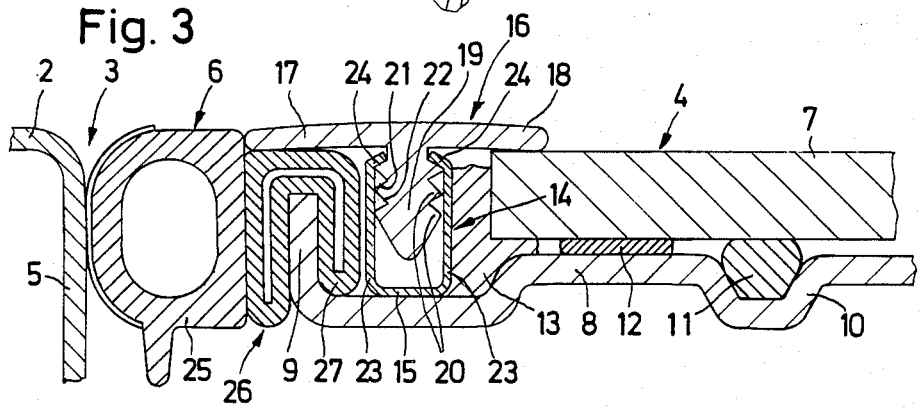
FIG. 3 is a sectional view to larger scale, taken along the line III—III in FIG. 1.

The automobile roof illustrated in FIG. 1 forms part of a passenger vehicle, the forward direction of travel of which is shown by the arrow 1. In the forward region, in respect of this direction, of a fixed roof surface 2 of the roof, there is a roof opening 3, in which a rigid lid 4 is situated, the lid 4 being shown in its closed position. As shown in FIG. 3, the lid 4 is sealed against a downwardly extending flange 5 of the fixed roof surface 2 by an edge gap sealing strip 6, which is secured to the lid 4 in a manner to be described below. The lid 4 can be of a sliding, lifting or a sliding-lifting type.

An inner frame 8 is situated beneath a lid plate 7 of glass or transparent plastics material, the inner frame 8 supporting the lid plate 7 in its edge region from below and preferably being formed from a metal sheet. The inner frame 8 projects beyond the outer edge of the lid plate 7 and terminates there in a raised rim 9. The lid plate 7 may be translucent. Actuating and guide elements for the lid 4, which are not illustrated because they do not form part of the present invention, act upon the inner frame 8.

In the inner frame 8 there is a peripheral, pressed-in, groove-shaped depression 10, into which a continuous, peripheral cord 11 is laid, which in its unloaded or non-compressed condition may have a circular cross-section, but which is shown in FIG. 3 in its compressed and therefore deformed condition. This cord 11 holds the lid plate 7 and the inner frame 8 apart at a predetermined distance, which is constant all around. In addition, a further deformable strip 12 may be inserted all around between lid plate 7 and inner frame 8, forming the inner boundary for a sealing compound or adhesive 13.

A substantially U-shaped clamping bar 14 is provided on the upper face of the inner frame 8 parallel to and at a distance from the raised rim 9, this bar 14 being made from resilient material having side walls 23 and being firmly connected, for example by being welded, by its base 15 to the inner frame 8. A border frame 16 co-operates, in a manner to be described, with the clamping bar 14.

The border frame 16 has a substantially T-shaped section, composed in one piece of an outwardly extending flange 17, an inwardly extending flange 18 flush therewith and a downwardly orientated web 19. The web 19 possesses, on either side, a plurality of integrally formed detents 20, each of which is defined by a downwardly inclined surface 21 and an upwardly inclined surface 22.

The upwardly orientated side walls 23 of the clamping bar 14 are resilient in a lateral direction, the free edges of the side walls 23 being bent over inwards towards each other to form detent edges 24. The detent edges 24 are orientated approximately to align with the downwardly inclined surfaces 21 of the detents 20, and ensure, in co-operation with the detents 20, a firm, but when required releasable, engagement of the inner frame 8 with the border frame 16.

In the example illustrated, the edge gap sealing strip 6 is composed of an outer, hollow chamber profile 25 and an inner fixing profile 26, firmly connected therewith. The fixing profile 26 has a downwardly open, substantially U-shaped cross-section, which enables the sealing strip 6 to be pushed onto the raised rim 9 of the inner frame 8. The flange 27 of the profile 26 engages into the defined gap between the raised rim 9 and the outer side wall 23 of the clamping bar 14. The profiles 25 and 26 are connected together so as to form a step between them, onto which the outwardly extending flange 17 of the border frame 16 is so placed that the external surface of the border frame 16 is generally flush with the external surface of the sealing strip 6.

By the stated cross-sectional construction of the clamping bar 14, this bar has a favourable, centering effect for the border frame 16 during pushing on and engagement of the border frame. The forming of the detents 20 on the central web 19 of the frame 16 ensures that the resilient side walls 23 of the clamping bar 14 are pressed sideways apart when the web 19 is pushed into the clamping bar 14 and, when the frame 16 is fully pushed in, i.e. after the two flanges 17, 18 of the border frame 16 have resiliently met the sealing strip 6 and the upper edge of the lid plate 7, bear with their detent edges 24 against the downwardly inclined surfaces 21 of the detents 20. The clamping bar 14 is thereby firmly but releasably locked with the border frame 16. The downwardly inclined surfaces 21 of the detents 20 formed on the web 19 ensure this releasability.

As explained, the border frame 16, when engaged with the clamping bar 14, engages with its outer flange 17 over the fixing flange 27 of the sealing strip 6 and with its inner flange 18 over the rim of the lid plate 7. To increase the clamping forces obtained from the flanges 17 and 18, these two flanges are preformed to a slightly convex shape as viewed from above, as shown in FIG. 3. The border frame 16 can be made as an extruded plastics profile or as an extruded light metal profile.

In assembling the lid, the cord 11 and, if applicable, the strip 12 are laid on the inner frame 8 already connected with the clamping bar 14, whereupon the lid plate 7 is laid on, with a sealing compound or adhesive 13 between. The inner side wall 23 of the clamping bar 14 advantageously constitutes, together with the rim of the lid plate 7 and, if applicable, the strip 12, a gap having defined, fixed walls, into which the liquid sealing compound or adhesive 13 can be introduced from above, the quantity and degree of filling being determined by visual inspection. In this way a simple control of the tightness before final fitting of the edge frame is achieved. Assembling of the lid is completed by engaging the border frame 16.

In this construction of lid, the arrangement of a clamping bar which has to be separately fitted and projects downwards beyond the inner frame is avoided, with the result that the clamping bar does not have any substantial influence upon the overall height of the lid. Since the border frame 16 firmly holds the sealing strip 6, pushed onto the raised rim 9, with its outer flange, the push-on height of the sealing strip 6 can be kept comparatively small, which in turn has a positive influence upon the desired low overall height of the lid. The overall height of the lid is therefore made up basically only from the material thickness of the inner frame 8, the thickness of the lid plate 7 and the thickness of the flanges 17, 18 of the border frame.

Since the clamping bar 14 is firmly and unreleasably connected to the inner frame 8, the lid can be easily assembled. For this purpose, after the sealing compound or adhesive has been applied onto the inner frame 8, the lid plate 7 has been fitted and the edge gap sealing strip 6 has been pushed onto the raised rim 9 of the inner frame 8, it only remains to engage the border frame 16 from above by its central web 19 with the clamping bar 14. Since this engagement is releasably constructed, the border frame can be removed without damage, if the sealing strip 6 has to be replaced when wear has occurred. Stripping-off of the sealing strip 6 due to its rubbing against the edge of the roof opening is not possible either during opening or during closing of the lid, because the sealing strip 6 is firmly held by the outer flange 17 of the border frame 16.

Figure 2:
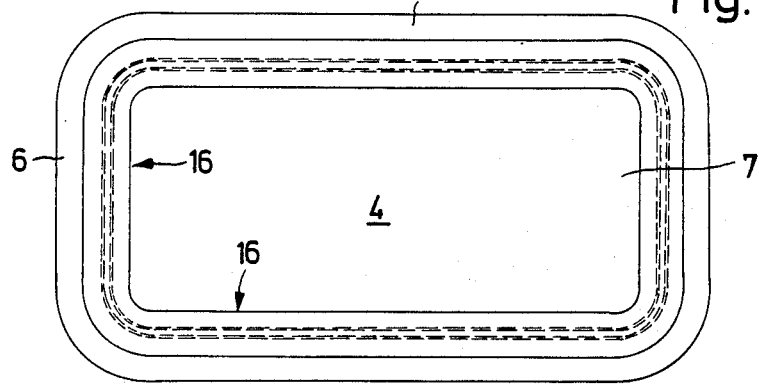
FIG. 2 is a plan view of the lid shown in FIG. 1.

FIGS. 4 to 6 show the second embodiment in which many features common to the first embodiment are to be found and therefore a full description of every part will not be repeated, it being understood that the common features can have the same characteristics as in the first embodiment. As is the case of the first embodiment shown in FIGS. 1 to 3, the cross-sectional views of FIGS. 5 and 6 are to a larger scale than the plan view of FIG. 4 and also larger than the actual dimensions of the parts in practice.

The fixed roof surface 2 of the automobile, in which the roof opening 3 is situated, is shown partly cut away in FIG. 6. In the roof opening there is situated the rigid lid 4, shown in its closed position, which is sealed against the downwardly extending flange 5 of the fixed roof surface 2 by the edge gap sealing strip 6'.

One can see the glass or transparent plastics lid plate 7, below which is the inner frame 8, supporting the lid plate 7 and terminating beyond the outer edge of the lid plate 7 in the raised rim 9.

The inner frame 8 has again the depression 10, in which the cord 11 is laid and the deformable strip 12 is also provided.

In this embodiment, a row of bores 28 is provided on the inner frame parallel to and at a distance from the raised rim 9, by means of which bores, in a manner to be described, the inner frame 8 is releasably connected with the edge frame 16'.

The border frame 16' has a substantially T-shaped cross-section, which is in one piece with the outer flange 17 and the inner flange 18 flush therewith. The border frame 16' also has a downwardly orientated web 19' which is equipped with a downwardly open slit 29, in each of the mutually facing lateral surfaces 30 and 31 of which a plurality of acute-angled grooves 32, 33 respectively is disposed, as can best be seen from FIG. 5.

The grooves 32 in the lateral surface 30 are offset in height relative to the grooves 33 in the other lateral surface 31 by the pitch of a screw thread. The mutual spacing of the grooves 32 and grooves 33 corresponds to the pitch of the aforementioned screw thread. The width of the slit 29 is approximately equal to the core diameter of fixing screws 34 (FIG. 6). As a consequence of this form of construction, the fixing screws 34 can be screwed into the slit 29 at any position in this slit, the thread of the screws 34 engaging into the grooves 32 and 33. The fixing screws 34 are passed through the bores 28 of the inner frame 8. When the fixing screws 34 are fully screwed into the slit 29, the inner frame 8 comes to bear against the lower face of the web 19' situated on either side of the slit 29, causing the spacing between the flanges 17 and 18 on the one hand and the inner frame 8 on the other hand to reach its minimum value as specified by the design. The height of the web 19' thus determines the spacing between the flanges 17, 18 and the inner frame 8. By unscrewing the fixing screws 34, the edge frame 16' can be released at any time in a simple manner from the other components of the lid structure.

The edge gap sealing strip 6' in this case is composed of the outer hollow chamber profile 25 as with the first embodiment and an inner fixing profile 26', firmly connected therewith. The fixing profile 26' has a downwardly open, substantially U-shaped cross-section, which enables the sealing strip 6' to be pushed onto the raised rim 9 of the inner frame 8. The fixing flange 27 now engages into the defined gap between the raised rim 9 and the web 19' of the border frame 16'. The profiles 25, 26' are again connected together with the forming of an outer step, onto which the outer flange 17 of the border frame 16' is so placed that the external surface of the border frame 16' is generally flush with the external surface of the sealing strip 6'.

As can be seen from FIG. 6, the border frame 16', screwed to the inner frame 8, engages with its outer flange 17 over the fixing flange 27 of the sealing strip 6' and with its inner flange 18 over the rim of the lid plate 7.

A covering lip 35 is integrally formed in one piece on the fixing profile 26', this covering lip bearing against the inner frame 8 and overlapping the fixing screws 34.

In the example shown, the covering lip 35 has a channel-shaped depression 36 for accommodating the heads of the fixing screws 34.

In assembling the lid, the cord 11 and, if applicable, the strip 12 are first laid upon the inner frame 8, whereupon the lid plate 7 is placed on and is fixed in position by the adhesive cord 11 and/or the adhesive strip 12. The sealing compound 13 is then applied along the edge of the lid plate 7, the edge gap sealing strip 6' is pushed on and the border frame 16' is placed in position. Assembling of the lid is completed by screwing the inner frame 8 to the border frame 16'.

The rigid lid constructed according to this embodiment manages without a clamping bar, because the fixing screws 34 take over its function. After the fixing screws 34 have been unscrewed, the border frame 16' can immediately be removed and the sealing strip 6', now accessible, easily replaced. The special construction of the web 19' of the border frame 16' is important for the present construction, because the lateral grooves formed in the two lateral surfaces of the slit 29 provide a screw-in thread at every position of the frame 16' for the fixing screws 34. In the fabrication of the frames 16' and 8, therefore, no special threaded bores need to be provided in the frame 16' for screwing-in the fixing screws 34, nor do any bores exactly aligned therewith need to be provided in the inner frame 8, i.e. in the fabrication of the two frames no account need be taken of otherwise unavoidable dimensional variations in the correspondence of bores in the two frames. The edge frame can be manufactured economically as an extruded profile, including its special grooves.

We claim:

1. A rigid lid construction for a sliding roof for an automobile comprising:
   a rigid lid plate haveing an edge region and an upper face;
   an edge gap sealing strip composed of an outer hollow profile and an inner fixing profilr connected therewith;
   a first inner frame supporting said lid plate from below in its edge region and having a peripheral raised rim on which said edge gap sealing strip is placed with said raised rim fitting into said inner fixing profile;
   a second border frame bearing against the upper face of said lid plate and having a T-shaped cross-section and carrying at a mid portion of said border frame a plurality of detents which project downwardly below said frame along a vertical leg of said T;
   a U-shaped clamping bar having at least one resilient side wall and a bottom which is interposed between said edge region of said rigid plate and said edge gap sealing strip and is secured at its bottom to said first inner frame;
   said clamping bar having a top narrowed opening into which said detents of said border frame are placed in order to push an outer side flange of said border frame against the fixing profile of said edge gap sealing means;
   adhesive means interposed between the edge region of said lid plate and a side of said clamping bar;
   said inner frame having a depression in a region below said lid plate for supporting a cord;
   a strip interposed between a bottom of said lid plate and said inner frame which together with said cord spaces the inner frame and lid plate at a predetermined distance; and
   said clamping bar connecting said border frame to said inner frame with the clamping bar fixed to the upper side of said inner frame and being resilient in a lateral direction whereby said clamping bar may be detached from said second border frame by lifting said second frame to remove it from said clamping bar and whereby said second frame is engaged by resiliently pressing its vertical leg into the opening of said clamping bar.

2. A lid according to claim 1 wherein said detents are integrally formed on both sides of the vertical web of the T-section and said detents are formed with a downwardly inclined surface and an upwardly inclined surface and the edges of said clamping bar opening are oriented to align with the downwardly inclined surfaces.

3. A lid according to claim 1 wherein an inner and said outer flange of said second frame are pre-curved in a convex form.

4. A lid according to claim 1 in which said lid plate is transparent.

5. A lid according to claim 1 in which a sealing compound is used as the adhesive means to secure the edge of said lid plate to said first frame.

6. A rigid lid construction for a sliding roof for an automobile comprising:
   a rigid lid plate having an edge region and an upper face;
   an edge gap sealing strip comprising an outer hollow profile and an inner fixing profile connected therewith;
   a first inner frame supporting said lid plate from below in its edge region and having a peripheral raised rim on which said edge gap sealing strip is placed with said raised rim fitting into said inner fixing profile;
   a second border frame bearing against the upper face of said lid plate and said edge gap sealing strip and having a T-shaped cross-section, and a downwardly oriented vertical web;
   said inner frame having a depression in which a cord is laid, a deformable strip being placed on the inner frame adjacent said depression and providing thereby a predetermined spacing between said inner frame and said rigid plate;
   said inner frame being provided with a row of bores parallel to said raised rim and at a predetermined distance from said rim for releasably connecting said inner frame to said border frame;
   a downwardly oriented vertical web of said T-cross section constituting said second border frame having a downwardly open slit and said slit being provided with a plurality of acute angle grooves for receiving a threaded fastener; and
   a plurality of threaded fasteners fitting into the grooves and bores for releasably connecting said inner frame to said border frame.

7. A rigid lid construction as claimed in claim 6 wherein said sealing strip is provided with a covering lip to cover said threaded fasteners.

8. A rigid lid construction as claimed in claim 6 wherein said covering lip has a channel-shaped recess to receive the heads of said threaded fasteners.

9. A rigid lid construction as claimed in claim 6 wherein said downwardly projecting web of said border frame bears against said first inner frame in an assembled condition.

10. A rigid lid construction as claimed in claim 6 wherein inner and outer flanges of said second border frame are precurved in convex form.

11. A rigid lid construction as claimed in claim 6 wherein sadi lid plate is transparent.

12. A rigid lid construction as claimed in claim 6 wherein said lid plate is secured to said first inner frame by means of a sealing compound.

* * * * *